(12) United States Patent
Marechal et al.

(10) Patent No.: US 11,986,914 B2
(45) Date of Patent: May 21, 2024

(54) SYSTEM FOR DISENGAGING A DRIVE SHAFT FROM A BEARING SUPPORT

(71) Applicant: SAFRAN AERO BOOSTERS, Herstal (BE)

(72) Inventors: Amaury Marechal, Herstal (BE); Colin Arnaud Felix Dhalluin, Herstal (BE); Jerome Nadaud, Herstal (BE)

(73) Assignee: Safran Aero Boosters, Herstal (BE)

( * ) Notice: Subject to any disclaimer, the term of this patent is extended or adjusted under 35 U.S.C. 154(b) by 0 days.

(21) Appl. No.: 18/248,357

(22) PCT Filed: Oct. 6, 2021

(86) PCT No.: PCT/EP2021/077509
§ 371 (c)(1),
(2) Date: Apr. 7, 2023

(87) PCT Pub. No.: WO2022/074035
PCT Pub. Date: Apr. 14, 2022

(65) Prior Publication Data
US 2024/0009784 A1    Jan. 11, 2024

(30) Foreign Application Priority Data
Oct. 8, 2020    (BE) .................................. 2020/5696

(51) Int. Cl.
*B23P 19/02*    (2006.01)
*F16C 35/06*    (2006.01)

(52) U.S. Cl.
CPC .......... *B23P 19/025* (2013.01); *F16C 35/062* (2013.01)

(58) Field of Classification Search
CPC ... B23P 15/025; B23P 15/027; B23P 2700/13; B23P 19/04; F16C 35/062;
(Continued)

(56) References Cited

U.S. PATENT DOCUMENTS 2,352,739 A * 7/1944 Sauer ...................... F16C 35/06
29/263
3,359,618 A * 12/1967 Murphy .................. B23P 19/02
29/283

(Continued)

FOREIGN PATENT DOCUMENTS

| EP | 1 110 677 A1 | 6/2001 |
| EP | 1 498 624 A1 | 1/2005 |

(Continued)

OTHER PUBLICATIONS

International Search Report mailed Jan. 10, 2022, issued in corresponding International Application No. PCT/EP2021/077509, filed Oct. 6, 2021, 5 pages.

(Continued)

*Primary Examiner* — Jason L Vaughan
(74) *Attorney, Agent, or Firm* — Christensen O'Connor Johnson Kindness PLLC

(57) ABSTRACT

A system for disengaging a drive shaft from a bearing support. An assembly formed by the drive shaft and the bearing support is placed above a cylinder, which pushes on the drive shaft by passing by the central hole of the bearing support. The bearing support is driven upwards, but is blocked by a first and a second force transfer device, which allows the drive shaft to be disengaged from the bearing support.

13 Claims, 4 Drawing Sheets

(58) Field of Classification Search
CPC ............. F05D 2230/70; Y10T 29/4978; Y10T 29/49318; Y10T 29/49815; Y10T 29/49822; Y10T 29/5383
See application file for complete search history.

(56) References Cited

U.S. PATENT DOCUMENTS

| | | | | |
|---|---|---|---|---|
| 3,403,434 A | * | 10/1968 | Calabro | F16C 35/062 29/402.03 |
| 3,790,356 A | * | 2/1974 | Bergling | B63H 23/321 29/283 |
| 3,880,604 A | * | 4/1975 | Hawkins | B23P 19/025 29/283 |
| 4,192,054 A | * | 3/1980 | Webb | B23P 19/021 29/252 |
| 4,506,424 A | * | 3/1985 | Ulbing | B23P 19/021 33/517 |
| 5,074,020 A | * | 12/1991 | Mechis | B25B 27/026 29/252 |
| 5,410,792 A | * | 5/1995 | Freeman | B25B 27/064 29/251 |
| 5,692,437 A | * | 12/1997 | Tabain | B25B 27/06 100/231 |
| 7,836,595 B1 | * | 11/2010 | Ohl, Jr. | F16D 1/0858 290/55 |
| 9,188,007 B2 | * | 11/2015 | Edwards | F01D 25/16 |
| 9,512,723 B2 | * | 12/2016 | Muller | F01D 25/285 |
| 2012/0151735 A1 | | 6/2012 | Thomas | |

FOREIGN PATENT DOCUMENTS

| | | |
|---|---|---|
| EP | 2 009 252 A1 | 12/2008 |
| JP | S5243800 U | 3/1977 |

OTHER PUBLICATIONS

Written Opinion mailed Jan. 10, 2022, issued in corresponding International Application No. PCT/EP2021/077509, filed Oct. 6, 2021, 7 pages.

* cited by examiner

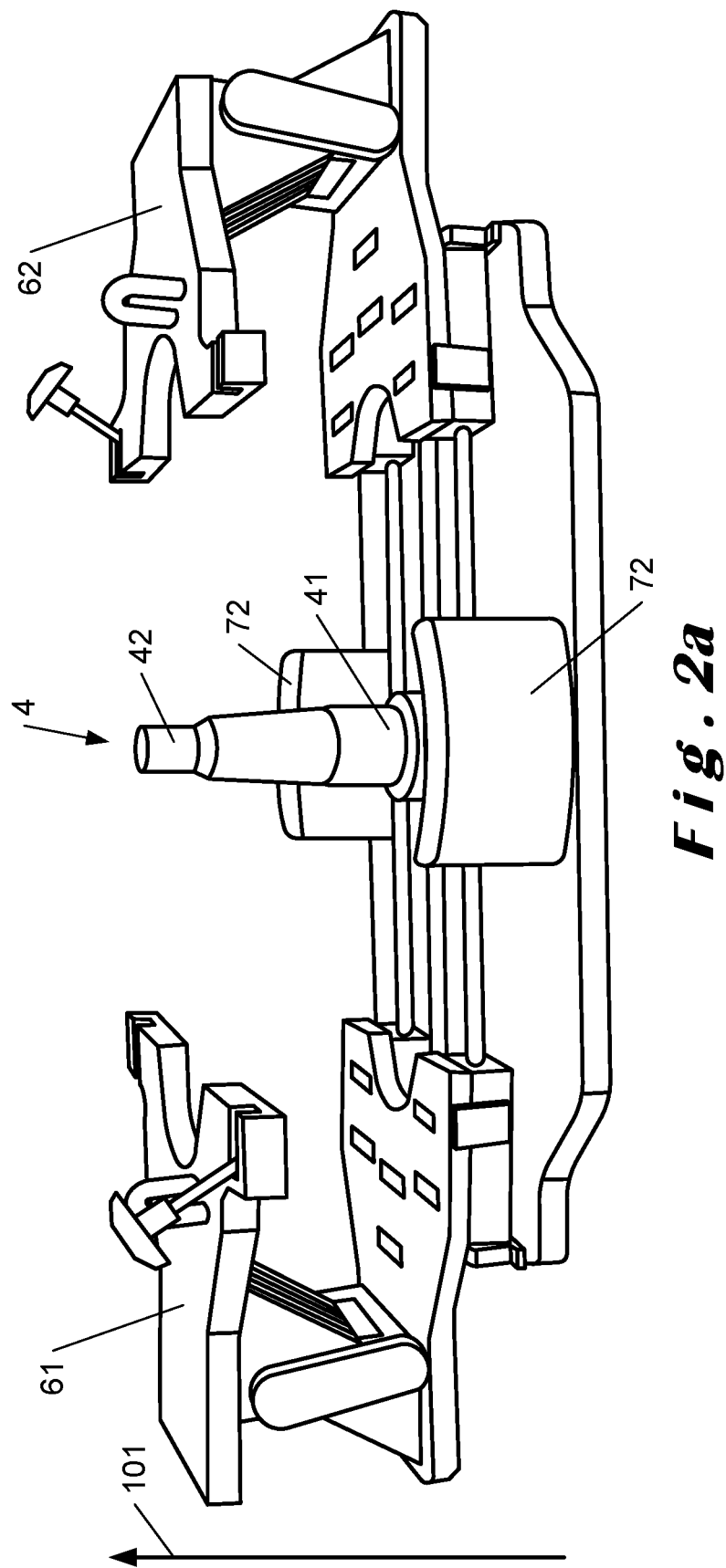

SYSTEM FOR DISENGAGING A DRIVE SHAFT FROM A BEARING SUPPORT

TECHNICAL FIELD

The present invention relates to a system for disengaging a drive shaft from a bearing support.

PRIOR ART

The attachment of a drive shaft and a bearing support of an aircraft turbomachine is described, for example, in the documents EP1498624A1 and EP2009252A1. The bearing support has a central hole in which the drive shaft engages. It may happen that the shaft has to be disengaged from the bearing support, e.g. because it has been detected that the assembling was incorrect. This disengaging is complicated by the fact that the shaft is fretted. In addition, there is a risk of damaging both parts if they are not manipulated with sufficient precision.

SUMMARY OF THE INVENTION

It is an object of the invention to provide a system allowing for disengaging a drive shaft from a bearing support in a simple manner, and which minimises the risks of damage to the parts.

To this end, the invention proposes a system for disengaging a drive shaft from a bearing support, the system comprising:
- a support device provided to carry the bearing support in which the drive shaft is engaged,
- a cylinder (that could also be named actuator or jack) mechanically coupled to the support device, and configured to be placed under the drive shaft, and to push the drive shaft upwards,
- a first force transfer device configured to be disposed around the drive shaft above the bearing support, and to block the bearing support so as to prevent it from displacing upward, and
- a second force transfer device mechanically coupled to the support device so as to prevent it from displacing upwards, and configured to be disposed around the first force transfer device to block the first force transfer device so as to prevent it from displacing upwards.

In the invention, the assembling formed by the bearing support and the drive shaft is arranged on the support device, the cylinder pushes the drive shaft upwards, while the second force transfer device prevents the first force transfer device from rising, and the latter prevents the bearing support from rising. This ensures that the bearing support remains in place while the drive shaft rises and disengages. This allows the parts to be disengaged easily. As the cylinder allows for a fine control, the risk of damage to the parts is reduced.

The support device preferably comprises a platform which directly or indirectly carries the bearing support in which the drive shaft is engaged. The first force transfer device comprises a hole wide enough to be passed through by the drive shaft and narrow enough to block the bearing support. The second force transfer device comprises an upper hole provided to be passed through by the drive shaft.

In one embodiment, the second force transfer device comprises a first and a second portion configured to move horizontally away from and towards each other so as to assemble together. Each of the first and second portions comprises a hole portion, so that when these two portions are assembled, said hole portions form an upper hole intended to be passed through by the drive shaft. This allows space to place the bearing support and the drive shaft on the support device.

In one embodiment, the two portions of the second force transfer device are provided to slide on elements attached to the support device, for example on rails. This allows the portions of the second force transfer device to be guided. The rails are configured to block any vertical movement of the second force transfer device.

In one embodiment, the second force transfer device comprises an upper portion configured to block the first force transfer device so as to prevent it from displacing upwards, and a lower portion configured to be mechanically coupled to the support device via rails. Since the drive shaft has a smaller diameter than the bearing support, this geometry allows for good load transfer.

In one embodiment, the lower portion of the second force transfer device comprises a lower hole through which the cylinder passes. This allows that the mechanical coupling between the cylinder and the support device does not pass through the second force transfer device.

In one embodiment, the portions of the first force transfer device intended to come into contact with the drive shaft and the bearing support are made of plastic. This allows to reduce the risk of damage to the parts.

In an embodiment, which the first force transfer device comprises a first portion and a second portion coupled by a hinge. These two portions are preferably semi-circular. This allows the first force transfer device to be easily opened and placed around the drive shaft.

In one embodiment, the first force transfer device comprises a radial projection provided to abut against the second force transfer device. Such a geometry allows a good load transfer.

In one embodiment, the first force transfer device has a cylindrical symmetry. Such a geometry allows a good load transfer.

In one embodiment, the system comprises a further, preferably equivalent, first force transfer device configured to be disposed around a further drive shaft from a further aircraft turbomachine, the second force transfer device being configured to be disposed around said further first force transfer device to block said further first force transfer device so as to prevent it from displacing upward. This allows the system according to the invention to be used for several types of turbomachines, by only changing the first transfer device.

In one embodiment, the support device comprises a platform and two blocks attached to said platform on either side of the cylinder. This allows the bearing support to be raised above the platform to minimise the risk of contact damage.

In one embodiment, the cylinder is a hydraulic cylinder, intended to be operated by a foot pump. This allows the operator to keep his eyes on the disengagement between the drive shaft and the bearing support, above the platform, while actuating the movement of the cylinder via his foot.

The invention further proposes an assembly comprising a drive shaft and a bearing support secured to each other, and a system according to one of the embodiments described herein and configured to disengage the drive shaft and the bearing support from each other.

The invention further proposes a method for using a system according to any of the embodiments of the invention, to disengage a drive shaft from a bearing support, the method comprising the following steps:

a) disposing the bearing support, in which the drive shaft is engaged, on the support device so that the cylinder is under the drive shaft,
b) disposing the first force transfer device around the drive shaft above the bearing support,
c) disposing the second force transfer device around the first force transfer device, and
d) actuating the cylinder so that it pushes the drive shaft upwards, the bearing support being blocked by the first force transfer device, the first force transfer device being blocked by the second force transfer device.

In one embodiment, the step (b) comprises attaching together a first portion and a second portion of the first force transfer device, each of the first and second portions being symmetrical shaped like a semicircle.

In one embodiment, the second force transfer device comprises a first portion and a second portion, the steps (a) and (b) being carried out with said first and second portions apart, and the step (c) comprises bringing closer and assembling said first and second portions together so as to form an upper hole through which the drive shaft passes.

BRIEF DESCRIPTION OF THE FIGURES

Further characteristics and advantages of the invention will become apparent from the following detailed description, for the understanding of which reference is made to the appended figures, among which:

FIG. 2a is a 3D view of a portion of a system according to one embodiment of the invention in which the first and second portions of the second force transfer device are shown in a remote position.

EMBODIMENTS OF THE INVENTION

Figure 1:
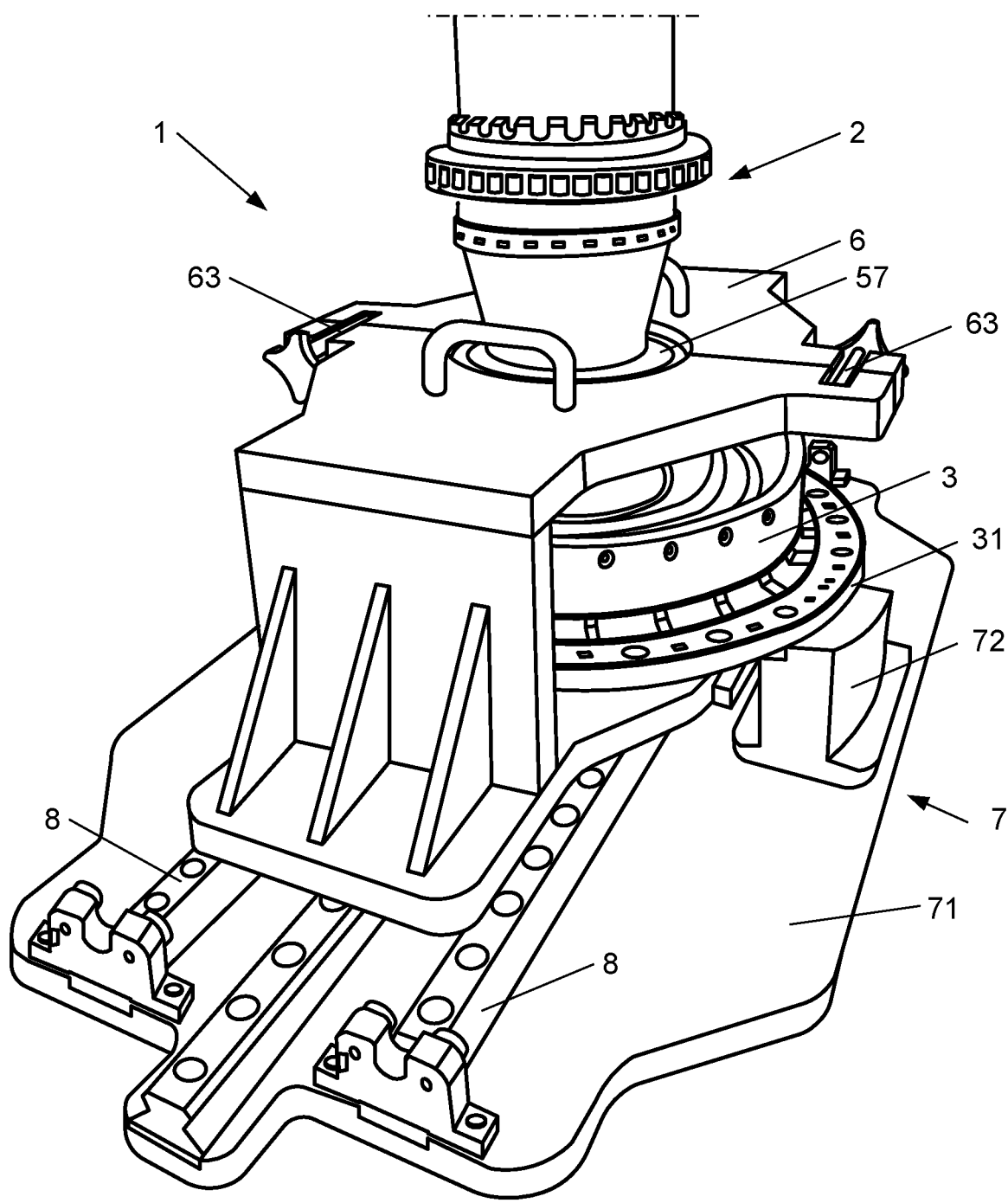
FIG. 1 is a 3D view of an assembling formed by the bearing support and the drive shaft in a system according to one embodiment of the invention.
Figure 2B:
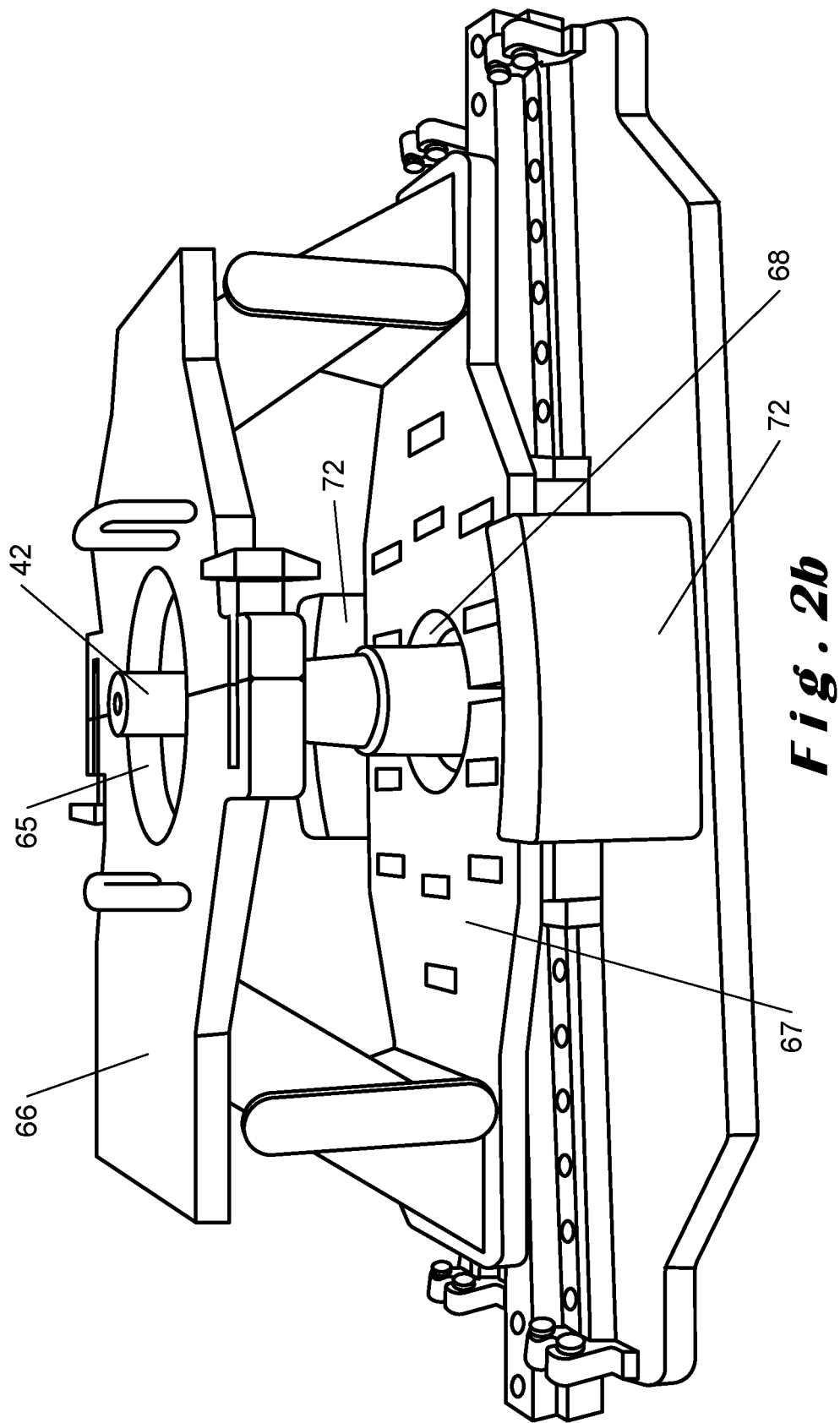
FIG. 2b is a 3D view of a portion of a system according to one embodiment of the invention in which the first and second portions of the second force transfer device are seen in close proximity.

The present invention is described with particular embodiments and references to figures but the invention is not limited thereby. The drawings or figures described are only schematic and are not limiting. In addition, the functions described may be carried out by structures other than those described in this document.

In the context of this present document, the terms "first" and "second" are used only to differentiate the various elements and do not imply an order between these elements.

In the figures, the identical or similar elements may have the same references. Some elements may be omitted from some figures, for example to improve the readability.

FIGS. 1 to 4 illustrate a system for disengaging a drive shaft 2 from a bearing support 3 according to one embodiment of the invention.

The assembling formed by the drive shaft 2 and the bearing support 3 is placed on a support device 7. The support device 7 preferably comprises a horizontal platform 71 and two blocks 72 attached to the platform 71. An external portion 31 of the bearing support 3 rests on the two blocks 72, and the central portion of the bearing support 3 comprising the central hole in which the drive shaft 2 is engaged is free. The platform 71 is preferably a table, which allows the operator to view the lifting of the drive shaft 2.

A cylinder 4 is attached to the platform 71, positioned so that it is under the central hole of the bearing support 3 and under the drive shaft 2. The cylinder 4 comprises a stationary portion 41 attached, directly or indirectly, to the platform 71, and a movable portion 42 configured to rise vertically upwards 101. The "upward" direction 101 is preferably exclusively vertical. The cylinder 4 is preferably a hydraulic cylinder actuated by a foot pump located lower than the platform 71.

A second force transfer device 6 is mechanically coupled to the platform 71, preferably via horizontal rails 8. It preferably comprises a first portion 61 and a second portion 62 which are symmetrical to each other in a vertical plane. The first 61 and second 62 portions can move away (FIG. 2a) and towards each other (FIG. 2b) by sliding on the rails 8. An attachment system 63 allows them to temporarily assemble them. The second force transfer device 6 preferably comprises a flat upper portion 66 and a flat lower portion 67. Handles are attached to the underside of the lower portion 67 to allow the sliding on the rails 8. The blocks 72 are preferably located on either side of the lower portion 67 when the first 61 and second 62 portions are assembled.

When the first 61 and second 62 portions are assembled (FIG. 2b), the upper portion 66 comprises, at the interface between the first 61 and second 62 portions, an upper hole 65 intended to be passed through by the drive shaft 2, and the lower portion 67 comprises, at the interface between the first 61 and second 62 portions, a lower hole 68 passed through by the stationary portion 41 of the cylinder 4, so that the cylinder 4 is directly attached to the platform 71.

When the assembling formed by the drive shaft 2 and the bearing support 3 is placed on a support device 7, a first force transfer device 5 is disposed around the drive shaft 2 above the bearing support 3, and in contact with the bearing support 3. The use of two force transfer devices 5, 6, which are preferably different parts, allows to be particularly precise when mounting the system on the bearing support and the drive shaft, which also minimises the risk of damage.

Figure 3:
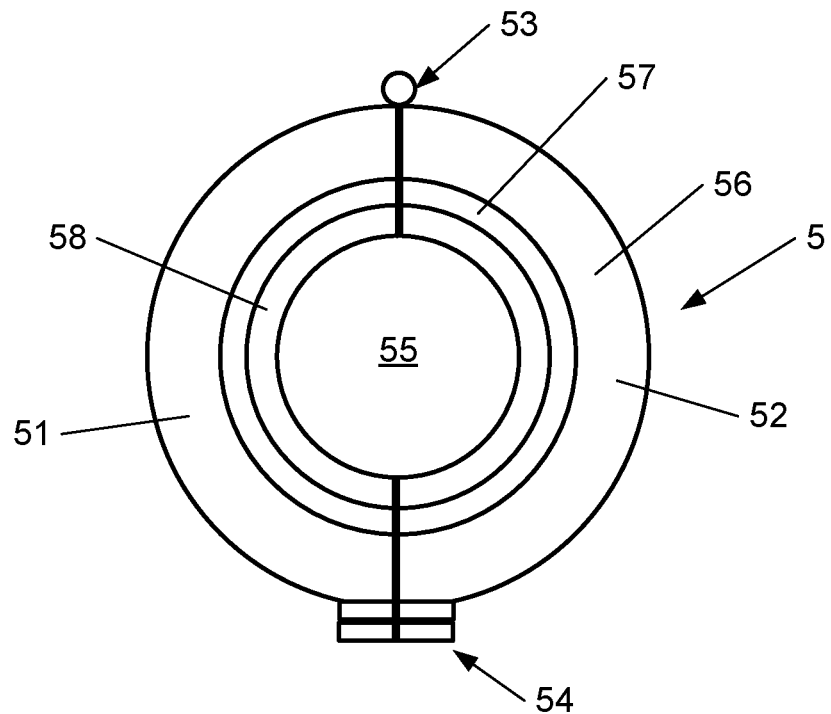
FIG. 3 is a top view of a first force transfer device in one embodiment of the invention.
Figure 4:
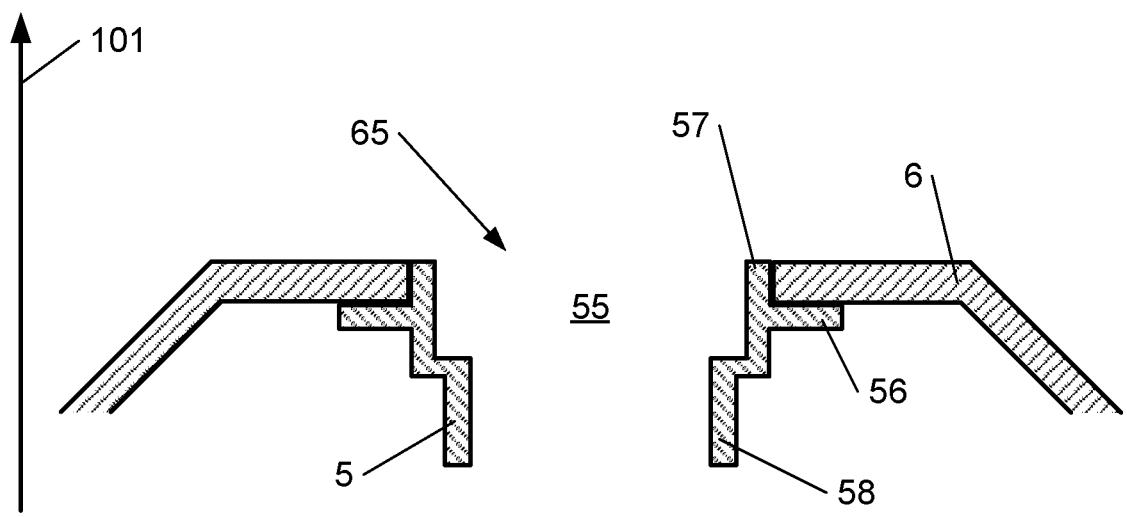
FIG. 4 is a cross-sectional view of a relative placement of the first and second force transfer devices in one embodiment of the invention.

An embodiment of the first force transfer device 5 is shown in FIG. 3, and FIG. 4 illustrates its positioning relative to the second force transfer device 6. The first force transfer device 5 is passed through by a hole 55. It is preferably cylindrical in shape. It comprises an outer radial projection 56 intended to abut vertically under the second force transfer device 6 around the upper hole 65, an upper portion 57 engaged in the upper hole 65, and a lower portion 58 under which the bearing support 3 abuts vertically. The internal surface of the hole 55 and the lower portion 58 are preferably made of plastic.

In one embodiment of the invention, the first force transfer device 5 comprises a first portion 51 and a second portion 52 which are symmetrical in a semicircle. They are preferably coupled by a hinge 53 on one side, and provided to be assembled by a temporary attachment device 54 on the other side. When disassembled, the opening left by the smaller of the two portions 51, 52 is preferably sufficient to pass the diameter of the drive shaft 2.

The second force transfer device 6 fits around the first force transfer device 5. It is preferably generic for many types of turbomachines. The first force transfer device 5 is intended to fit closely around the drive shaft 2 and to be in contact with the bearing support 3. Preferably, each type of turbomachine has its own first force transfer device 5, the dimensions of which are adapted to those of the drive shaft 2 and the bearing support 3 of that type of turbomachine. For this purpose, the invention proposes a system 1 comprising two first force transfer devices 5: the one described so far and another one, adapted to another type of turbomachine. The other first force transfer device is configured to be disposed around another drive shaft from the other type of aircraft turbomachine and to have a configuration that is suitable for the second force transfer device 6. For example, the dimensions of the upper portions 57 are preferably identical for the first force transfer device 5 and for the other first force transfer device. They are preferably of different colours to be easily distinguished.

It is possible to use a system 1 according to the invention in the following way. Initially, the first 61 and second 62 portions, leaving a space between them, are used to position the assembling formed by the drive shaft 2 and the bearing support 3 on the blocks 72. Once this assembling has been disposed in this way (by means of a lifting tool), the first force transfer device 5 is disposed around the drive shaft 2 above the bearing support 3, for example by opening the hinge 53 and then bringing the first 51 and second 52 portions together and locking them with the attachment device 54. The lower portion 58 of the first force transfer device 5 is in contact with the bearing support 3 so as to block an upward movement of it.

The first 61 and second 62 portions of the second force transfer device 6 are then brought together by sliding them on the rails 8, for example with the aid of handles. The edge of the upper hole 65 preferably fits around the upper portion 57, and above the radial projection 56. The drive shaft 2 passes through the hole 55 of the first force transfer device 5, and through the upper hole 65. The cylinder 4 passes through the lower hole 68. The first 61 and second 62 portions are locked by the attachment system 63.

Then the cylinder 4 is activated by the foot pump. The movable portion 42 rises, contacts the drive shaft 2 in the central hole of the bearing support 3, and pushes the drive shaft 2 upwards 101. Thus, the cylinder 4 does not touch the bearing support 3 because it passes through the hole in the bearing support 3 in which the drive shaft 2 is engaged. As the bearing support 3 is assembled with the drive shaft 2, it is also pushed upwards 101. However, it is blocked by the first force transfer device 5, which is itself blocked by the second force transfer device 6, which is itself blocked by the rails 8.

In other words, the invention relates to a system 1 for disengaging a drive shaft 2 from a bearing support 3. The assembling formed by the drive shaft 2 and the bearing support 3 is placed above a cylinder 4, which pushes on the drive shaft 2 by passing by the central hole of the bearing support 3. The bearing support 3 is driven upwards 101, but is blocked by a first 5 and a second 6 force transfer device, which allows the drive shaft 2 to be disengaged from the bearing support 3.

The present invention has been described above in connection with specific embodiments, which are illustrative and should not be considered limiting. In a general manner, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

The invention claimed is:

1. A system for disengaging a drive shaft from a bearing support, the system comprising:
    a support device provided to carry the bearing support in which the drive shaft is engaged;
    a cylinder mechanically coupled to the support device, the cylinder configured to be placed under the drive shaft and to push the drive shaft upwards;
    a first force transfer device disposed around the drive shaft above the bearing support, the first force transfer device configured to block the bearing support so as to prevent the bearing support from displacing upward;
    a second force transfer device mechanically coupled to the support device, the second force transfer device configured to prevent the bearing support from displacing upwards, the second force transfer device being disposed around the first force transfer device to block the first force transfer device so as to prevent the first force transfer device from displacing upwards; and
    wherein the second force transfer device comprises a first portion and a second portion configured to move horizontally away from and towards each other so as to assemble together, each of the first and second portions comprising a hole portion, such that when the first and second portions are assembled together, the hole portions together form an upper hole adapted to be passed through by the drive shaft.

2. The system according to claim 1, wherein at least one of the first and second portions of the second force transfer device is configured to slide on elements, attached to the support device.

3. The system according to claim 1, wherein the second force transfer device comprises an upper portion configured to block the first force transfer device so as to prevent the first force transfer device from displacing upwards, and a lower portion configured to be mechanically coupled to the support device.

4. The system according to claim 3, wherein the lower portion comprises a lower hole through which the cylinder passes.

5. The system according to claim 1, wherein portions of the first force transfer device intended to come into contact with the drive shaft and the bearing support are made of plastic.

6. The system according to claim 1, wherein the first force transfer device comprises a first portion and a second portion coupled to the first portion by a hinge.

7. The system according to claim 1, wherein the first force transfer device comprises a radial projection configured to abut against the second force transfer device.

8. The system according to claim 1, wherein the first force transfer device has a cylindrical symmetry.

9. The system according to claim 1, comprising a further first force transfer device configured to be disposed around a further drive shaft from a further aircraft turbomachine, the second force transfer device being configured to be disposed around the further first force transfer device to block the further first force transfer device so as to prevent the further force transfer device from displacing upwards.

10. The system according to claim 1, wherein the support device comprises a platform and two blocks attached to the platform on either side of the cylinder.

11. The system according to claim 1, wherein the cylinder is a hydraulic cylinder intended to be operated by a foot pump.

12. A method for using a system according to claim 1 to disengage a drive shaft from a bearing support, the method comprising:
  (a) disposing the bearing support in which the drive shaft is engaged on the support device, so that the cylinder is under the drive shaft;
  (b) disposing the first force transfer device around the drive shaft above the bearing support;
  (c) disposing the second force transfer device around the first force transfer device;
  (d) actuating the cylinder so that the cylinder pushes the drive shaft upwards, the bearing support being blocked by the first force transfer device, the first force transfer device being blocked by the second force transfer device; and
  the steps (a) and (b) being carried out with the first and second portions of the second force transfer device spaced apart, and the step (c) comprises bringing closer and assembling the first and second portions of the second force transfer device together so as to form an upper hole through which the drive shaft passes.

13. The method according to claim 12, wherein the step (b) comprises attaching together a first portion and a second portion of the first force transfer device, each of the first and second portions having a semi-circular shape.

\* \* \* \* \*